(12) United States Patent
Beierling et al.

(10) Patent No.: US 12,006,230 B2
(45) Date of Patent: Jun. 11, 2024

(54) PROCESS FOR MAKING A NICKEL COMPOSITE HYDROXIDE

(71) Applicant: BASF SE, Ludwigshafen am Rhein (DE)

(72) Inventors: Thorsten Beierling, Ludwigshafen (DE); Daniela Pfister, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 573 days.

(21) Appl. No.: 17/290,876

(22) PCT Filed: Oct. 30, 2019

(86) PCT No.: PCT/EP2019/079678
§ 371 (c)(1),
(2) Date: May 3, 2021

(87) PCT Pub. No.: WO2020/094482
PCT Pub. Date: May 14, 2020

(65) Prior Publication Data
US 2021/0371298 A1    Dec. 2, 2021

(30) Foreign Application Priority Data

Nov. 9, 2018  (EP) .................................... 18205504

(51) Int. Cl.
*C01G 53/00*  (2006.01)
*H01M 4/525*  (2010.01)

(52) U.S. Cl.
CPC ........... *C01G 53/006* (2013.01); *C01G 53/66* (2013.01); *C01P 2004/61* (2013.01); *C01P 2006/12* (2013.01); *H01M 4/525* (2013.01)

(58) Field of Classification Search
None
See application file for complete search history.

(56) References Cited

U.S. PATENT DOCUMENTS

| | | | | |
|---|---|---|---|---|
| 2009/0290287 A1* | 11/2009 | Lipka | .................... | H01G 11/46 361/502 |
| 2012/0104311 A1* | 5/2012 | Levasseur | ............... | C01G 51/42 252/182.1 |
| 2012/0175568 A1 | 7/2012 | Krippels et al. | | |
| 2013/0337331 A1* | 12/2013 | Mori | ..................... | H01M 4/131 117/70 |
| 2016/0093881 A1 | 3/2016 | Schroedle et al. | | |
| 2017/0133677 A1* | 5/2017 | Ryoshi | .................. | H01M 4/525 |
| 2017/0355614 A1 | 12/2017 | Erk et al. | | |
| 2018/0190978 A1* | 7/2018 | Toma | ................... | C01G 53/006 |

FOREIGN PATENT DOCUMENTS

| | | | | |
|---|---|---|---|---|
| EP | 0848438 A1 | * | 8/1999 | |
| EP | 3042409 A2 |   | 7/2016 | |
| EP | 3225591 A1 | * | 10/2017 | ............ C01G 53/00 |
| EP | 3225591 A1 |   | 10/2017 | |
| WO | 2016055910 A1 |   | 4/2016 | |
| WO | 2016067960 A1 |   | 5/2016 | |
| WO | 2018015207 A1 |   | 1/2018 | |
| WO | 2018167533 A1 |   | 9/2018 | |

OTHER PUBLICATIONS

Tichit, D., et al. Characterization of calcined and reduced multi-component Co—Ni—Mg—Al-layered double hydroxides. Eur. J. Inorg. Chem. 2001, 539-546. (Year: 2001).*
Giovannelli, F., et al. Magnetic properties of Ni(II)—Mn(III) LDHs. Materials Chemistry and Physics 137 (2012) 55-60. (Year: 2012).*
Coq, B., et al. Co/Ni/Mg/Al layered double hydroxides as precursors of catalysts for the hydrogenation of nitriles: Hydrogenation of acetonitrile. Journal of Catalysis 189, 117-128 (2000). (Year: 2000).*
Kovanda, F. and Jirátová, K. Supported layered double hydroxide-related mixed oxides and their application in the total oxidation of volatile organic compounds. Applied Clay Science 53 (2011) 305-316. (Year: 2011).*
International Search Report and Written Opinion for corresponding PCT/EP2019/079678 mailed Dec. 13, 2019, 12 Pages.

* cited by examiner

*Primary Examiner* — Anthony J Zimmer
*Assistant Examiner* — Zachary John Baum
(74) *Attorney, Agent, or Firm* — Armstrong Teasdale LLP

(57) ABSTRACT

Described herein is a process for making a nickel composite hydroxide with a mean particle diameter d50 in the range from 3 to 20 μm including combining
(a) an aqueous solution of water-soluble salts of nickel and of at least one of cobalt and manganese, and, optionally, at least one of Al, Mg, B, or transition metals other than nickel, cobalt, and manganese,
(b) an aqueous solution of an alkali metal hydroxide and
(c) an aqueous solution of alkali metal (bi)carbonate or ammonium (bi)carbonate in the molar ratio of 0.001:1 to 0.04:1, and, optionally,
(d) an aqueous solution of alkali metal aluminate,
in a continuous stirred tank reactor or in a cascade of at least two continuous stirred tank reactors.

12 Claims, No Drawings

PROCESS FOR MAKING A NICKEL COMPOSITE HYDROXIDE

CROSS-REFERENCE TO RELATED APPLICATIONS

This application is a U.S. National Phase Application of International Patent Application No. PCT/EP2019/079678, filed Oct. 30, 2019, which claims the benefit of priority to European Patent Application No. 18205504.6 filed Nov. 9, 2018, the entire contents of which are hereby incorporated by reference herein.

The present invention is directed towards a process for making a nickel composite hydroxide with a mean particle diameter d50 in the range from 3 to 20 µm comprising the combination of
(a) an aqueous solution of water-soluble salts of nickel and of at least one of cobalt and manganese, and, optionally, at least one of Al, Mg, B, or transition metals other than nickel, cobalt, and manganese,
(b) with an aqueous solution of an alkali metal hydroxide,
(c) an aqueous solution of alkali metal (bi)carbonate or ammonium (bi)carbonate in the molar ratio of 0.001:1 to 0.04:1, referring to alkali metal hydroxide from solution (b), and, optionally,
(d) an aqueous solution of alkali metal aluminate,
in a continuous stirred tank reactor or in a cascade of at least two continuous stirred tank reactors in one or more steps, wherein
solutions (b) and (c) are combined first, followed by combination with solution (a) and, if applicable, with solution (d),
or solutions (a) and (c) are combined first followed by combination with solution (b) and, if applicable, with solution (d),
or solutions (a), (b), (c) and, if applicable, (d) are combined simultaneously.

Secondary batteries, accumulators or rechargeable batteries are just some embodiments by which electrical energy can be stored after generation and used (consumed) when required. Owing to the significantly better power density, there has been a departure in recent times from the water-based secondary batteries and development of batteries in which the charge transport is accomplished by lithium ions.

The electrode material is of crucial importance for the properties of a lithium ion battery. Lithium-containing mixed transition metal oxides have gained particular significance, for example spinels and mixed oxides of layered structure, especially lithium-containing mixed oxides of nickel, manganese and cobalt; see, for example, EP 1 189 296. However, not only the stoichiometry of the electrode material is important, but also other properties such as morphology and surface properties.

Corresponding mixed oxides are prepared generally using a two-stage process. In a first stage, a sparingly soluble salt of the transition metal(s) is prepared by precipitating it from a solution, for example a carbonate or a hydroxide. This sparingly soluble salt is in many cases also referred to as a precursor. In a second stage, the precipitated salt of the transition metal(s) is mixed with a lithium compound, for example $Li_2CO_3$, LiOH or $Li_2O$, and calcined at high temperatures, for example at 600 to 1100° C.

Existing lithium ion batteries still have potential for improvement, especially with regard to the energy density. For this purpose, the cathode material should have a high specific capacity. It is also advantageous when the cathode material can be processed in a simple manner to give electrode layers of thickness from 20 µm to 200 µm which should have a high density in order to achieve a maximum energy density (per unit volume).

In EP 3 225 591 A1, a process for making transition metal hydroxides is disclosed. For the co-precipitation, alkali metal hydroxide is mixed with a minor amount of carbonate. A carbonate containing composite hydroxide with a narrow particle size distribution is obtained.

It was an objective of the present invention to provide a precursor from which excellent electrode active materials for lithium ion batteries may be synthesized, especially with respect to volumetric energy density by combining high gravimetric capacity and high tap density of the respective electrode active material. It was furthermore an objective of the present invention to provide a suitable process for making such precursors.

Accordingly, the process defined at the outset has been found, hereinafter also referred to as inventive process or process according to the (present) invention.

The inventive process is a process for making a nickel composite hydroxide with a mean particle diameter (d50) in the range from 3 to 20 µm, preferably 4 to 15 µm. The mean particle diameter (d50) in the context of the present invention refers to the median of the volume-based particle diameter, as can be determined by light scattering, for example.

In one embodiment of the present invention, the width of the particle diameter distribution of nickel composite hydroxide made according to the present invention is at least 0.61, for example 0.61 to 2, preferably 0.65 to 1.5, expressed as [(d90-d10)/(d50) diameter].

The process according to the invention relates to the preparation of nickel composite hydroxides. In the context of the present invention, "nickel composite hydroxides" includes not only stoichiometrically pure hydroxides of nickel and at least one of cobalt and manganese, but especially also cations other than transition metal cations, namely magnesium cations, and, optionally, one more cation other than transition metal cations, for example aluminum or boron—as borate—and alkali metal ions, and, optionally, anions other than hydroxide ions, for example oxide ions and sulfate anions.

In one embodiment of the present invention, the term "nickel composite hydroxides" refers to composite hydroxides of nickel and at least one of cobalt and manganese and, optionally, at least one of aluminum, magnesium, boron, and transition metals other than nickel, cobalt, and manganese, wherein the molar content of nickel is in the range from 60 to 98%, referring to the cations in said nickel composite hydroxide.

Said nickel composite hydroxide may contain traces of other metal ions, for example traces of ubiquitous metals such as sodium, Ca or Zn, but such traces will not be taken into account in the description of the present invention. Traces in this context will mean amounts of 0.01 mol-% or less, referring to the total metal content of said nickel composite hydroxide.

In one embodiment of the present invention, said nickel composite hydroxide contains a combination of transition metals and further metals according to general formula (I)

$$(Ni_aCo_bAl_c)_{1-d}M_d \qquad (I)$$

a is in the range from 0.70 to 0.95,
b is in the range of from 0.025 to 0.2,
c is in the range of from 0.005 to 0.1, and
d is in the range of from zero to 0.05, M is selected is selected from Mg, B and transition metals other than Co and Mn, and combinations of at least two of the foregoing,
wherein a+b+c=1.0.

In a preferred embodiment of the present invention, said nickel composite hydroxide contains a combination of transition metals and further metals according to general formula (III)

$$(Ni_aCo_bAl_c)_{1-d}M_d \qquad (III)$$

wherein:
a is in the range from 0.80 to 0.95,
b is in the range of from 0.025 to 0.195,
c is in the range of from 0.02 to 0.05, and
d is in the range of from zero to 0.03,
M is selected from one or more of Ti, Zr, Nb, W, and Mg, and combinations of Mg and at least one of Ti, Zr, Nb, and W,
wherein a+b+c=1.0 and b+c<0.20.

In one embodiment of the present invention, M includes Mg in the range of from 0.1 to 2.5 mol-% per sum of metals in said nickel composite hydroxide.

In one embodiment of the present invention, said nickel composite hydroxide contains a combination of transition metals and further metals according to general formula (IV)

$$(Ni_aCo_bMn_c)_{1-d}M_d \qquad (IV)$$

with
a being in the range of from 0.6 to 0.95,
b being in the range of from 0.025 to 0.2,
c being in the range of from 0.025 to 0.2, and
d being in the range of from zero to 0.1,
M is selected from Al, Mg, Ti, Zr, W and Nb and combinations of at least two of the foregoing, and
a+b+c=1.

In one embodiment of the present invention, nickel composite hydroxide has 0.01 to 10 mol % and preferably 0.3 to 5 mol % of anions other than hydroxide or carbonate ions, based on the total number of anions, for example sulfate.

The inventive process comprises the combination of:
(a) an aqueous solution of water-soluble salts of nickel and of at least one of cobalt and manganese, and, optionally, at least one of Al, Mg, B, or transition metals other than nickel, cobalt, and manganese, hereinafter also referred to as "solution (a)",
(b) with an aqueous solution of an alkali metal hydroxide, hereinafter also referred to as "solution (b)", and
(c) an aqueous solution of alkali metal (bi)carbonate or ammonium (bi)carbonate to hydroxide in the molar ratio of 0.001:1 to 0.04:1, hereinafter also referred to as "solution (c)", and, optionally,
(d) an aqueous solution of alkali metal aluminate, hereinafter also referred to as "solution (d)",
in a continuous stirred tank reactor or in a cascade of at least two continuous stirred tank reactors in one or more steps, wherein
solutions (b) and (c) are combined first followed by a combination with solution (a) and, if applicable, with solution (d),
or solutions (a) and (c) are combined first followed by combination with solution (b) and, if applicable, with solution (d),
or solutions (a), (b), (c), and, if applicable, (d) are combined simultaneously.

The term water-soluble salts of nickel or of metals other than nickel refers to salts that exhibit a solubility in distilled water at 25° C. of 25 g/l or more, the amount of salt being determined under omission of crystal water and of water stemming from aquo complexes. Water-soluble salts of nickel, cobalt and manganese may preferably be the respective water-soluble salts of $Ni^{2+}$, $Co^{2+}$, and $Mn^{2+}$. Examples of water-soluble salts of nickel and cobalt and manganese are the sulfates, the nitrates, the acetates and the halides, especially chlorides. Preferred are nitrates and sulfates, of which the sulfates are more preferred.

In one embodiment of the present invention, the concentration of solution (a) can be selected within wide ranges. Preferably, the total concentration is selected such that they are within the range of, in total, 1 to 1.8 mol of the transition metals/kg of solution, more preferably 1.5 to 1.7 mol of the transition metals/kg of solution. "The transition metal salts" used herein refers to the water-soluble salts of nickel, cobalt and manganese, as far as applicable, and may include salts of other metals, for example of magnesium or aluminum or transition metals other than nickel and cobalt and manganese.

Another example of water-soluble salts is alaun, $KAl(SO_4)_2$.

Solution (a) may have a pH value in the range of from 2 to 5. In embodiments wherein higher pH values are desired, ammonia may be added to solution (a).

Solution (b) is an aqueous solution of alkali metal hydroxide. An example of alkali metal hydroxides is lithium hydroxide, preferred is potassium hydroxide and a combination of sodium and potassium hydroxide, and even more preferred is sodium hydroxide.

In one embodiment of the present invention, solution (b) has a concentration of alkali metal hydroxide in the range from 1 to 50% by weight, preferably 10 to 40% by weight, percentages referring to entire solution (b).

The pH value of solution (b) is preferably 13 or higher, for example 14.5.

Solution (c) is an aqueous solution of alkali metal (bi)carbonate or ammonium (bi)carbonate, preferred are carbonates. Ammonium carbonate and sodium carbonate are more preferred, and eve more preferred is sodium carbonate.

In one embodiment of the present invention, solution (b) is an aqueous solution of sodium hydroxide and solution (c) is an aqueous solution of sodium carbonate.

In one embodiment of the present invention, solution (c) has a concentration of alkali metal (bi)carbonate in the range of from 1 to 15% by weight, percentages referring to entire solution (c).

In embodiments wherein solution (c) is a solution of an alkali metal carbonate, the pH value of solution (c) is 7 or higher, for example 9 to 13.

In one embodiment of the present invention, the molar ratio of hydroxide and (bi)carbonate in solutions (b) and (c) is in the range of from 0.001 to 0.04, preferably 0.001 to 0.02.

In one embodiment of the present invention, the inventive process includes the addition of a solution (d) comprising alkali metal aluminate, for example potassium aluminate and especially sodium aluminate, for example with a concentration in the range of from 1 to 15% by weight. The pH value of solution (d) may be in the range of from 13 to more than 14.

In one embodiment of the present invention, the inventive process is performed at temperatures in the range from 10 to 85° C., preferably at temperatures in the range from 20 to 60° C.

In one embodiment of the present invention, solutions (b) and (c) are combined first followed by a combination with solution (a). The step of combining solutions (b) and (c) may also be referred to as "base pre-mixing step". The base pre-mixing step may be performed at a temperature in the range of from 10 to 90° C.

In one embodiment of the present invention, solutions (a) and (c) are combined first followed by combination with solution (b). In said embodiment, it is preferred that the pH value after combination of solutions (a) and (c) and before addition of solution (b) is in the range of from 4 to 6 so a premature carbonate precipitation can be avoided as well as $CO_2$ evolution.

In on embodiment of the present invention, solutions (a), (b) and (c) are combined simultaneously, for example through different entries into a continuous stirred tank reactor.

In one embodiment of the present invention, the pH value at the end of the step of combining solutions (a), (b) and (c) is in the range from 8 to 12, preferably 10.5 to 12.0, more preferably 11.3 to 12.9 and even more preferably from 11.5 to 12.8, each measured in the mother liquor at 23° C.

Solution (d), if applicable, may be combined with solution (b) first or during the base pre-mixing step. In other embodiments, solution (d) is combined with solutions (a), (b) and (c) simultaneously.

In one embodiment of the present invention, the inventive process is carried out in a cascade of at least two continuous stirred tank reactors, and (a) is combined with (b) and (c) in the first tank reactor at a pH value in the range of from 12.0 to 12.8 and in the second tank reactor at a pH value in the range of from 11.5 to 12.4. In such embodiments, a better particle growth can be achieved. Preferably, such cascade has exactly two stirred tank reactors.

In one embodiment of the present invention, the inventive process has a duration in the range of from 1 hour to 10 hours. In this context, the duration corresponds to the average residence time in the continuous stirred tank reactor or in the cascade, respectively.

In one embodiment of the present invention, the inventive process is performed at a pressure in the range from 500 mbar to 20 bar, preferably standard pressure (1 atm).

In one embodiment of the present invention, the content of oxygen dissolved in the slurry formed in the inventive process is reduced by bubbling a rare gas or nitrogen through the slurry during the inventive process.

In one embodiment of the present invention, an excess of precipitant is used, for example an excess of the sum of carbonate and alkali metal hydroxide, based on transition metal. The molar excess may, for example, be in the range from 1.01:1 to 100:1. It is preferable to work with a stoichiometric proportion of precipitant.

In one embodiment of the present invention, the inventive process is performed in the presence of at least one compound L which may serve as a ligand for at least one of the transition metals, for example in the presence of at least one organic amine or especially of ammonia. In the context of the present invention, water should not be regarded as a ligand. Compound L may be added together with solution (a) or solution (c) or separately.

In one embodiment of the present invention, a concentration of L, especially of ammonia, within the range from 0.05 to 1 mol/l, preferably 0.1 to 0.7 mol/l, is selected. Particular preference is given to amounts of ammonia for which the solubility of $Ni^{2+}$ in the mother liquor is not more than 1000 ppm, more preferably not more than 500 ppm.

In one embodiment of the present invention, mixing during the inventive process is effected, for example, with a stirrer. Preference is given to introducing a stirrer output of at least 0.4 W/l into the reaction mixture, preferably up to 8 W/l and more preferably up to 4 W/l.

By applying the inventive process, the particle size will be generated automatically.

A further aspect of the present invention is directed towards nickel composite hydroxides, hereinafter also referred to as inventive nickel composite hydroxides. Inventive nickel composite hydroxides are in particulate form with a mean particle diameter d50 in the range from 3 to 20 μm and a width of particle diameter distribution, calculated as [(d90-d10)/(d50)] of at least 0.61, contain in the range of from 60 to 95 mole-% Ni and at least one transition metal selected from Co and Mn, and in the range of from 0.1 to 3.0% by weight of carbonate, referring to said nickel composite hydroxide.

In a preferred embodiment of the present invention, inventive nickel composite hydroxides have a composition according to general formula (II)

$$(Ni_aCo_bAl_c)_{1-d}M_dO_x(OH)_y(CO_3)_z \quad \text{(II)}$$ 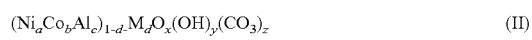

wherein a is a number in the range from 0.70 to 0.95, preferably 0.80 to 0.95, b is in the range of from 0.025 to 0.2, preferably 0.025 to 0.195, c is in the range of from 0.005 to 0.1, preferably from 0.02 to 0.05, and d is in the range of from zero to 0.05, M is selected from Mg, B and transition metals other than Co and Mn, preferably Mg or a combination of Mg and at least one of B and a transition metals other than Co and Mn, for example Zr, Ti, W or Nb, wherein a+b+c=1.0 and x<1, 1<y≤2.1, and zero<z≤0.25.

Preferably, b+c<0.20.

In one embodiment of the present invention, inventive nickel composite hydroxide has a specific surface (BET) in the range of from 5 to 70 m²/g, determined after outgassing at 120° C. for 40 minutes and in accordance with DIN ISO 9277:2010.

Such nickel composite hydroxides are excellently useful for making cathode active materials for lithium ion batteries. Another aspect of the present invention is thus the use of inventive nickel composite hydroxides as precursors for the manufacture of cathode active materials for lithium ion batteries. Another aspect of the present invention is a process for making cathode active materials for lithium ion batteries wherein said process comprises the steps of mixing an inventive nickel composite hydroxide with a lithium source such as, but not limited to $Li_2CO_3$, $Li_2O$, $LiNO_3$, LiOH or LiOH·$H_2O$, and thermally treating such mixture in the presence of oxygen and at a temperature in the range of from 600 to 900° C. Preferred lithium sources are $Li_2CO_3$, $Li_2O$, LiOH and LiOH·$H_2O$ and combinations of at least two of the foregoing.

The present invention is further illustrated by a working example.

All percentages are percent by weight unless specifically indicated otherwise.

EXAMPLE 1

The following solutions were made:

Solution (a.1): aqueous solution of $NiSO_4$ and $CoSO_4$ (molar ratio Ni:Co of 19:1) with a total metal concentration of 1.63 mol/kg Solution (b.1): aqueous solution of NaOH, 25% by weight Solution (c.1): aqueous solution of $Na_2CO_3$, 5% by weight Solution (d.1): 10% by weight aqueous solution of $NaAlO_2$ in water Ammonia solution: 25% By weight aqueous $NH_3$ solution Solution (b.1) and (c.1) were mixed so that the molar ratio of carbonate to hydroxide was 0.002.

A 46-l stirred tank reactor with overflow system was charged with aqueous 3% by weight ammonium sulfate solution. The temperature in the tank reactor was set to 60° C. while the ammonium sulfate solution was stirred. Nitrogen gas flow was introduced into the reactor to decrease oxygen content in the reaction volume below 2%.

Solution (a.1) was introduced to the reactor at a rate of 8.6 kg/h. Simultaneously, solution (d.1), the ammonia solution and the combined solutions (b.1) and (c.1) were introduced through separate feeds into the reactor at rates of 0.135 kg/h, 0.39 kg/h and 3.2 kg/h, respectively. The flow rate of the combined solutions (b.1) and (c.1) was adjusted by a pH regulation circuit to keep the pH value in the range of 12.2±0.1.

Throughout the process, reaction temperature was maintained at 60° C. and the stirring speed was set to introduce about 2 W/l into reaction volume. The stirred tank reactor was operated continuously keeping the liquid level in the reactor vessel essentially constant. Inventive nickel composite hydroxide M-OH.1 with an average particle size d50 of 13.4 μm was collected via free overflow from the stirred tank reactor and isolated by filtration.

The metal content of the resultant hydroxide-OH.1 was $Ni_{0.905}Co_{0.475}Al_{0.475}$. The variable z in the respective formula (I.1) corresponds to 0.048.

M-OH.1 is mixed with LiOH in about equimolar amounts. The resulting mixture is calcined at 755° C. for 9 hours in a forced flow of oxygen-enriched air, molar ratio $O_2/N_2$ of 3:2. A cathode active material is obtained that exhibits high gravimetric capacity and high tap density.

EXAMPLE 2

The following solutions were made:

Solution (a.2): aqueous solution of $NiSO_4$ and $CoSO_4$ (molar ratio Ni:Co of 24:1) with a total metal concentration of 1.65 mol/kg Solution (b.2): mixture of aqueous solution of NaOH and aqueous solution of ammonia. The NaOH concentration and ammonia concentration in this solution were 23.7 w % and 2.7 w %, respectively.

Solution (c.2): aqueous solution of $Na_2CO_3$, 0.28% by weight

Solution (d.2): 5.3% by weight aqueous solution of $NaAlO_2$

Solution (b.2) and (c.2) were mixed so that the molar ratio of carbonate to hydroxide was 0.0022.

A 8-l stirred tank reactor with overflow system was charged with aqueous 3% by weight ammonium sulfate solution. The temperature in the tank reactor was set to 60° C. while the ammonium sulfate solution was stirred. Nitrogen gas flow was introduced into the reactor to decrease oxygen content in the reaction volume below 2%.

Solution (a.2) was introduced to the reactor at a rate of 1128.3 g/h. Simultaneously, solutions (d.2), (b.2) and (c.2) were introduced into the reactor at rates of 197.2 g/h, 499.7 g/h and 257.2 g/h, respectively. The flow rate of the combined solutions (b.2) and (c.2) was adjusted by a pH regulation circuit to keep the pH value in the range of 12.2±0.1.

Throughout the process, reaction temperature was maintained at 60° C. and the stirring speed was set to introduce about 2 W/l into reaction volume. The stirred tank reactor was operated continuously keeping the liquid level in the reactor vessel essentially constant. Inventive nickel composite hydroxide M-OH.2 with an average particle size d50 of 13.3 μm was collected via free overflow from the stirred tank reactor and isolated by filtration.

The metal content of M-OH.2 was $Ni_{0.905}Co_{0.375}Al_{0.575}$.

M-OH.2 is mixed with LiOH in about equimolar amounts. The resulting mixture is calcined at 755° C. for 9 hours in a forced flow of oxygen-enriched air, molar ratio $O_2/N_2$ of 3:2. A cathode active material is obtained that exhibits high gravimetric capacity and high tap density.

EXAMPLE 3

The following solutions were made:

Solution (a.3): aqueous solution of $NiSO_4$ and $CoSO_4$ (molar ratio Ni:Co of 24:1) with a total metal concentration of 1.65 mol/kg Solution (b.3): mixture of aqueous solution of NaOH and aqueous solution of ammonia. The NaOH concentration and ammonia concentration in this solution were 23.7 w % and 2.7 w %, respectively.

Solution (c.3): aqueous solution of $Na_2CO_3$ 0.28% by weight

Solution (d.3): 5.3% by weight aqueous solution of $NaAlO_2$

Solution (b.3) and (c.3) were mixed so that the molar ratio of carbonate to hydroxide was 0.0022.

A 8-l stirred tank reactor with overflow system was charged with aqueous 3% by weight ammonium sulfate solution. The temperature in the tank reactor was set to 60° C. while the ammonium sulfate solution was stirred. Nitrogen gas flow was introduced into the reactor to decrease oxygen content in the reaction volume below 2%.

Solution (a.3) was introduced to the reactor at a rate of 1128.3 g/h. Simultaneously, solutions (d.3), (b.3) and (c.3) were introduced into the reactor at rates of 197.2 g/h, 499.7 g/h and 257.2 g/h, respectively. The flow rate of the combined solutions (b.3) and (c.3) was adjusted by a pH regulation circuit to keep the pH value in the range of 12.5±0.1.

Throughout the process, reaction temperature was maintained at 60° C. and the stirring speed was set to introduce about 2 W/l into reaction volume. The stirred tank reactor was operated continuously keeping the liquid level in the reactor vessel essentially constant. Inventive nickel composite hydroxide M-OH:3 with an average particle size d50 of 4.1 μm was collected via free overflow from the stirred tank reactor and isolated by filtration.

The metal content of M-OH.3 was $Ni_{0.905}Co_{0.375}Al_{0.575}$.

M-OH.3 is mixed with LiOH in about equimolar amounts. The resulting mixture is calcined at 755° C. for 9 hours in a forced flow of oxygen-enriched air, molar ratio $O_2/N_2$ of 3:2. A cathode active material is obtained that exhibits high gravimetric capacity and high tap density.

EXAMPLE 4

The following solutions were made:
Solution (a.4): aqueous solution of $NiSO_4$ and $CoSO_4$ (molar ratio Ni:Co of 24:1) with a total metal concentration of 1.65 mol/kg
Solution (b.4): mixture of aqueous solution of NaOH and aqueous solution of ammonia. The NaOH concentration and ammonia concentration in this solution were 23.7 w % and 2.7 w %, respectively.
Solution (c.4): aqueous solution of $Na_2CO_3$ 0.28% by weight
Solution (d.4): 5.3% by weight aqueous solution of $NaAlO_2$
Solution (b.4) and (c.4) were mixed so that the molar ratio of carbonate to hydroxide was 0.0022.

A 8-l stirred tank reactor with overflow system was charged with aqueous 3% by weight ammonium sulfate solution. The temperature in the tank reactor was set to 60° C. while the ammonium sulfate solution was stirred. Nitrogen gas flow was introduced into the reactor to decrease oxygen content in the reaction volume below 2%.

Solution (a.4) was introduced to the reactor at a rate of 1128.3 g/h. Simultaneously, solutions (d.4), (b.4) and (c.4) were introduced into the reactor at rates of 197.2 g/h, 499.7 g/h and 257.2 g/h, respectively. The flow rate of the combined solutions (b.4) and (c.4) was adjusted by a pH regulation circuit to keep the pH value in the range of 12.3±0.1.

Throughout the process, reaction temperature was maintained at 60° C. and the stirring speed was set to introduce about 2 W/l into reaction volume. The stirred tank reactor was operated continuously keeping the liquid level in the reactor vessel essentially constant. Inventive nickel composite hydroxide M-OH.4 with an average particle size d50 of 11 μm was collected via free overflow from the stirred tank reactor and isolated by filtration.

The metal content of M-OH.4 was $Ni_{0.905}Co_{0.375}Al_{0.575}$.
M-OH.4 is mixed with LiOH in about equimolar amounts. The resulting mixture is calcined at 755° C. for 9 hours in a forced flow of oxygen-enriched air, molar ratio $O_2/N_2$ of 3:2. A cathode active material is obtained that exhibits high gravimetric capacity and high tap density.

EXAMPLE 5

The following solutions were made:
Solution (a.5): aqueous solution of $NiSO_4$ and $CoSO_4$ (molar ratio Ni:Co of 24:1) with a total metal concentration of 1.65 mol/kg
Solution (b.5): mixture of aqueous solution of NaOH and aqueous solution of ammonia. The NaOH concentration and ammonia concentration in this solution were 23.7 w % and 1.35 w %, respectively.
Solution (c.5): aqueous solution of $Na_2CO_3$ 0.48% by weight
Solution (d.5): 5.3% by weight aqueous solution of $NaAlO_2$
Solution (b.5) and (c.5) were mixed so that the molar ratio of carbonate to hydroxide was 0.0038.

A 8-l stirred tank reactor with overflow system was charged with aqueous 1.5% by weight ammonium sulfate solution. The temperature in the tank reactor was set to 60° C. while the ammonium sulfate solution was stirred. Nitrogen gas flow was introduced into the reactor to decrease oxygen content in the reaction volume below 2%.

Solution (a.5) was introduced to the reactor at a rate of 1128.3 g/h. Simultaneously, solutions (d.5), (b.5) and (c.5) were introduced into the reactor at rates of 197.2 g/h, 499.7 g/h and 257.2 g/h, respectively. The flow rate of the combined solutions (b.5) and (c.5) was adjusted by a pH regulation circuit to keep the pH value in the range of 11.8±0.1.

Throughout the process, reaction temperature was maintained at 60° C. and the stirring speed was set to introduce about 2 W/l into reaction volume. The stirred tank reactor was operated continuously keeping the liquid level in the reactor vessel essentially constant. Inventive nickel composite hydroxide M-OH.5 with an average particle size d50 of 15.9 μm was collected via free overflow from the stirred tank reactor and isolated by filtration.

The metal content of M-OH.5 was $Ni_{0.905}Co_{0.375}Al_{0.575}$.
M-OH.5 is mixed with LiOH in about equimolar amounts. The resulting mixture is calcined at 755° C. for 9 hours in a forced flow of oxygen-enriched air, molar ratio $O_2/N_2$ of 3:2. A cathode active material is obtained that exhibits high gravimetric capacity and high tap density.

EXAMPLE 6

The following solutions were made:
Solution (a.6): aqueous solution of $NiSO_4$ and $CoSO_4$ (molar ratio Ni:Co of 24:1) with a total metal concentration of 1.65 mol/kg
Solution (b.6): mixture of aqueous solution of NaOH and aqueous solution of ammonia. The NaOH concentration and ammonia concentration in this solution were 23.7 w % and 1.35 w %, respectively.
Solution (c.6): aqueous solution of $Na_2CO_3$ 0.48% by weight
Solution (d.6): 5.3% by weight aqueous solution of $NaAlO_2$
Solution (b.6) and (c.6) were mixed so that the molar ratio of carbonate to hydroxide was 0.0038.

A 8-l stirred tank reactor with overflow system was charged with aqueous 1.5% by weight ammonium sulfate solution. The temperature in the tank reactor was set to 60° C. while the ammonium sulfate solution was stirred. Nitrogen gas flow was introduced into the reactor to decrease oxygen content in the reaction volume below 2%.

Solution (a.6) was introduced to the reactor at a rate of 1128.3 g/h. Simultaneously, solutions (d.6), (b.6) and (c.6) were introduced into the reactor at rates of 197.2 g/h, 499.7 g/h and 257.2 g/h, respectively. The flow rate of the combined solutions (b.6) and (c.6) was adjusted by a pH regulation circuit to keep the pH value in the range of 12.0±0.1.

Throughout the process, reaction temperature was maintained at 60° C. and the stirring speed was set to introduce about 2 W/l into reaction volume. The stirred tank reactor was operated continuously keeping the liquid level in the reactor vessel essentially constant. Inventive nickel composite hydroxide M-OH.6 with an average particle size d50 of 10.0 μm was collected via free overflow from the stirred tank reactor and isolated by filtration.

The metal content of M-OH.6 was $Ni_{0.905}Co_{0.375}Al_{0.575}$.
M-OH.6 is mixed with LiOH in about equimolar amounts. The resulting mixture is calcined at 755° C. for 9 hours in a forced flow of oxygen-enriched air, molar ratio $O_2/N_2$ of 3:2. A cathode active material is obtained that exhibits high gravimetric capacity and high tap density.

The invention claimed is:
1. A nickel composite hydroxide in particulate form with a mean particle diameter d50 in the range from 3 to 20 μm and a width of particle diameter distribution, calculated as [(d90−d10)/(d50)], of at least 0.61, containing in the range of from 60 to 95 mole-% Ni and at least one transition metal selected from the group consisting of Co and Mn, and in the range of from 0.1 to 3.0% by weight of carbonate, with respect to said nickel composite hydroxide.

2. The nickel composite hydroxide according to claim 1 having a composition according to general formula (II)

$$(Ni_aCo_bAl_c)_{1-d}M_dO_x(OH)_y(CO_3)_z \qquad (II)$$

wherein
a is in the range from 0.60 to 0.95,
b is in the range of from 0.025 to 0.2,
c is in the range of from 0.005 to 0.1,
d is in the range of from zero to 0.05, and
M is selected from the group consisting of Mg, B and transition metals other than Co and Ni, and combinations of at least two of the foregoing,
wherein a+b+c=1.0,
$0 \leq x < 1$,
$1 < y \leq 2.1$, and
$0 < z \leq 0.25$.

3. The nickel composite hydroxide according to claim 1 wherein the metal part has a composition according to general formula (III)

$$(Ni_aCo_bAl_c)_{1-d}M_d \qquad (III)$$

wherein:
a is in the range from 0.80 to 0.95,
b is in the range of from 0.025 to 0.195,
c is in the range of from 0.02 to 0.05,
d is in the range of from zero to 0.035, and
M is selected from the group consisting of one or more of Ti, Zr, Nb, W, and Mg, and combinations of Mg and at least one of Ti, Zr, Nb, and W,
wherein a+b+c=1.0 and
b+c<0.20.

4. The nickel composite hydroxide according to claim 1 wherein said nickel composite hydroxide has a specific surface (BET) in the range of from 5 to 70 m²/g.

5. A method of using the nickel composite hydroxide according to claim 1, the method comprising using the nickel composite hydroxide as a precursor for the manufacture of cathode active materials for lithium ion batteries.

6. A process for making the nickel composite hydroxide of claim 1 comprising combining
(a) an aqueous solution of water-soluble salts of nickel and of at least one of cobalt and manganese, and, optionally, at least one of Al, Mg, B, or transition metals other than nickel, cobalt, and manganese,
(b) an aqueous solution of an alkali metal hydroxide,
(c) an aqueous solution of alkali metal (bi)carbonate or ammonium (bi)carbonate in the molar ratio of 0.001:1 to 0.04:1, referring to alkali metal hydroxide, and, optionally,
(d) an aqueous solution of alkali metal aluminate,
in a continuous stirred tank reactor or in a cascade of at least two continuous stirred tank reactors in one or more steps, wherein
solutions (b) and (c) are combined first followed by combination with solution (a) and optionally with solution (d), or solutions (a) and (c) are combined first followed by combination with solution (b) and optionally with solution (d),
or solutions (a), (b), (c) and optionally (d) are combined simultaneously.

7. The process according to claim 6 wherein said nickel composite hydroxide contains a combination of transition metals and further metals according to general formula (I)

$$(Ni_aCo_bAl_c)_{1-d}M_d \qquad (I)$$

wherein
a is in the range from 0.70 to 0.95,
b is in the range of from 0.025 to 0.2,
c is in the range of from 0.005 to 0.1,
d is in the range of from zero to 0.05, and
M is selected from the group consisting of Mg, B and transition metals other than Co and Ni, and combinations of at least two of the foregoing,
wherein a+b+c=1.0.

8. The process according to claim 6, wherein said process is carried out a pH value in the range of from 11.5 to 12.8.

9. The process according to claim 6, wherein said process is carried out in a cascade of at least two continuous stirred tank reactors, and wherein (a) is combined with (b) and (c) in the first tank reactor at a pH value in the range of from 12.0 to 12.8 and in the second tank reactor at a pH value in the range of from 11.5 to 12.4.

10. The process according to claim 7, wherein M includes Mg in the range of from 0.1 to 2.5 mole-% with respect to the metals in said nickel composite hydroxide.

11. The process according to claim 6, wherein the water-soluble salts are selected from the group consisting of sulfates and nitrates.

12. The process according to claim 6, wherein said process includes the addition of a solution (d) comprising alkali metal aluminate.

* * * * *